US011881080B2

(12) United States Patent
Boesen et al.

(10) Patent No.: US 11,881,080 B2
(45) Date of Patent: *Jan. 23, 2024

(54) METHOD OF ENABLING RESTORATION OF GAMES AND A METHOD OF RESTORING GAMES

(71) Applicant: Aristocrat Technologies Australia Pty Limited, North Ryde (AU)

(72) Inventors: John Leslie Boesen, Menai (AU); Chi We Chim, Beecroft (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 93 days.

This patent is subject to a terminal disclaimer.

(21) Appl. No.: 17/406,748

(22) Filed: Aug. 19, 2021

(65) Prior Publication Data

US 2021/0383646 A1 Dec. 9, 2021

Related U.S. Application Data

(63) Continuation of application No. 16/535,538, filed on Aug. 8, 2019, now Pat. No. 11,100,754, which is a (Continued)

(30) Foreign Application Priority Data

Dec. 23, 2009 (AU) ................................ 2009906270

(51) Int. Cl.
*G07F 17/32* (2006.01)

(52) U.S. Cl.
CPC .......... *G07F 17/3239* (2013.01); *G07F 17/32* (2013.01); *G07F 17/3218* (2013.01); *G07F 17/3241* (2013.01); *G07F 17/3255* (2013.01)

(58) Field of Classification Search
CPC .. G07F 17/32; G07F 17/3218; G07F 17/3241; G07F 17/3255
See application file for complete search history.

(56) References Cited

U.S. PATENT DOCUMENTS 6,240,100 B1 5/2001 Riordan
6,364,765 B1 * 4/2002 Walker ................ G07F 17/3234 463/19

(Continued)

FOREIGN PATENT DOCUMENTS

CN 101015738 A 8/2007
CN 101310310 B 3/2012

(Continued)

OTHER PUBLICATIONS

Office Action dated Oct. 6, 2020 for U.S. Appl. No. 16/535,538 (pp. 1-23).

(Continued)

*Primary Examiner* — Chase E Leichliter
(74) *Attorney, Agent, or Firm* — Armstrong Teasdale LLP

(57) ABSTRACT

A system includes a first game machine, a second game machine, and a session server. The session server includes a processor configured to at least receive, from the first game machine, a request from a player to enable restoration of a game, and in response to receiving the request to enable restoration of the game, register a session identifier in association with a player account of the player. The processor is also configured to store the session identifier in association with the player account to a session identifier database, and receive, from the second game machine and in response to a player request to restore the game, at least player account information associated with the player account. In addition, the processor is configured to retrieve the session identifier from the session identifier database in response to receiving the player account information, and (Continued)

determine, based upon the session identifier, whether to enable restoration of the game.

17 Claims, 9 Drawing Sheets

Related U.S. Application Data continuation of application No. 12/976,639, filed on Dec. 22, 2010, now Pat. No. 10,453,299.

(56) References Cited

U.S. PATENT DOCUMENTS 6,811,486 B1* 11/2004 Luciano, Jr. ........ G07F 17/3239 463/19
6,884,172 B1 4/2005 Lloyd
6,923,721 B2 8/2005 Luciano
7,182,690 B2* 2/2007 Giobbi ................ G07F 17/3267 463/24
7,367,888 B1* 5/2008 Chen ..................... A63F 13/798 463/43
7,370,190 B2* 5/2008 Calhoon ............... H04L 9/0662 713/176
7,522,900 B2 4/2009 Allott
7,584,154 B1* 9/2009 Chen ...................... G06Q 10/10 463/42
7,811,167 B2 10/2010 Giobbi
8,190,108 B2 5/2012 Sorrells
8,190,116 B2 5/2012 Sorrells
8,223,898 B2 7/2012 Sorrells
8,224,281 B2 7/2012 Sorrells
8,229,023 B2 7/2012 Sorrells
8,233,855 B2 7/2012 Sorrells
8,313,371 B1* 11/2012 Luciano, Jr. ............ G07F 17/32 463/19
8,371,919 B2 2/2013 Hornik
8,574,062 B2 11/2013 Giobbi
9,293,001 B2 3/2016 Anderson
10,453,299 B2* 10/2019 Boesen ................... G07F 17/32
11,100,754 B2* 8/2021 Boesen ............... G07F 17/3218
2001/0034263 A1 10/2001 Roberts
2001/0046893 A1* 11/2001 Giobbi .................... G07F 17/32 463/16
2002/0094871 A1* 7/2002 Luciano, Jr. ............ G07F 17/32 463/16
2003/0073494 A1* 4/2003 Kalpakian ........... G07F 17/3244 463/16
2003/0104857 A1 6/2003 Jenkins
2003/0199310 A1 10/2003 Kaminkow
2004/0002384 A1* 1/2004 Multerer ................. A63F 13/73 463/42
2004/0176157 A1* 9/2004 Walker ................ G07F 17/3262 463/16
2004/0219967 A1 11/2004 Giobbi
2005/0227753 A1 10/2005 Luciano, Jr.
2005/0233802 A1* 10/2005 Gatto ...................... G07F 17/32 463/25
2005/0265373 A1 12/2005 Khan
2006/0058103 A1 3/2006 Danieli
2006/0105836 A1* 5/2006 Walker ................ G07F 17/3239 463/25
2006/0111186 A1 5/2006 Hattori
2006/0189382 A1 8/2006 Muir
2007/0010309 A1 1/2007 Giobbi
2007/0021198 A1 1/2007 Muir
2007/0026916 A1 2/2007 Juds
2007/0117623 A1 5/2007 Nelson
2007/0155490 A1 7/2007 Phillips
2007/0191090 A1* 8/2007 O'Halloran ......... G07F 17/3269 463/20
2007/0259713 A1 11/2007 Fiden
2008/0026853 A1 1/2008 Crowder
2008/0076573 A1* 3/2008 Loehrer .............. G07F 17/3232 463/42
2008/0087521 A1 4/2008 Cole
2008/0090650 A1* 4/2008 Tarantino ............ A63F 3/00157 463/25
2008/0163055 A1 7/2008 Ganz
2008/0234044 A1 9/2008 Aida
2008/0234047 A1* 9/2008 Nguyen .............. G07F 17/3234 463/42
2008/0274792 A1* 11/2008 Walker .................... G07F 17/32 463/43
2008/0300049 A1* 12/2008 Anderson ........... G07F 17/3267 463/25
2009/0005169 A1* 1/2009 Pellegrinelli ....... G07F 17/3276 463/43
2009/0054136 A1* 2/2009 Gagner ................... G07F 17/32 463/25
2009/0074191 A1 3/2009 Gatto
2009/0087076 A1* 4/2009 Jenrick .................. G07B 11/02 382/135
2009/0104968 A1 4/2009 Englman
2009/0124376 A1* 5/2009 Kelly .................. G07F 17/3239 463/29
2009/0189895 A1 7/2009 James
2009/0203433 A1 8/2009 Olivas
2009/0275402 A1* 11/2009 Backover ............ G07F 17/3239 463/29
2009/0325690 A1* 12/2009 Zhou ..................... A63F 13/335 463/29
2010/0167810 A1* 7/2010 Fitzsimons ......... G07F 17/3234 463/43
2010/0240442 A1* 9/2010 Anderson ............... G07F 17/32 463/43
2010/0285878 A1* 11/2010 Tarantino ............ G07F 17/3239 463/36
2011/0111835 A1* 5/2011 Cohen ................. G07F 17/3244 463/43
2011/0151979 A1* 6/2011 Boesen ............... G07F 17/3239 463/43
2012/0004026 A1* 1/2012 Vann ................... G07F 17/3244 463/25
2019/0362595 A1* 11/2019 Boesen ............... G07F 17/3239
2021/0383646 A1* 12/2021 Boesen ............... G07F 17/3218

FOREIGN PATENT DOCUMENTS

EP 1705564 9/2006
EP 1890231 A3 8/2008
GB 2443264 4/2008
IE 950162 9/1995
JP 2009061344 A 3/2009
JP 2009061345 A 3/2009
JP 2009061346 A 3/2009
JP 2009061347 A 3/2009
JP 2009061348 A 3/2009
MX 2007010957 11/2007
MX 2007011042 11/2007
NL 1016736 C2 5/2002
SG 136965 A1 11/2007
WO 0105477 1/2001
WO 0120489 3/2001
WO 0176708 A1 10/2001
WO 2004014502 2/2004
WO 2006098931 9/2006
WO 2007014000 2/2007
WO 2007075380 7/2007
WO 2007086779 8/2007
WO 2008050146 5/2008

OTHER PUBLICATIONS

Office Action dated Mar. 16, 2021 for U.S. Appl. No. 16/535,538 (pp. 1-20).
Australian Examination Report No. 1 for App. No. AU2020203302, dated Feb. 10, 2021, 3 pages.

(56) References Cited

OTHER PUBLICATIONS

Notice of Allowance dated May 5, 2021 for U.S. Appl. No. 16/535,538 (pp. 1-9).

* cited by examiner

METHOD OF ENABLING RESTORATION OF GAMES AND A METHOD OF RESTORING GAMES

CROSS REFERENCE TO RELATED APPLICATIONS

This application is a continuation of and claims the benefit of U.S. patent application Ser. No. 16/535,538, filed Aug. 8, 2019, which is a continuation of and claims the benefit of U.S. patent application Ser. No. 12/976,639, filed Dec. 22, 2010, which claims priority to Australian Provisional Patent Application Serial No. 2009906270, filed Dec. 23, 2009, all of which are incorporated herein by reference in their entirety.

FIELD

The present invention relates to a method of enabling restoration of games, a method of restoring games, a game controller, a gaming machine and a gaming system.

BACKGROUND

Some electronic wagering games unlock game features as a player progresses through different stages. Such games may require significant amount of game play to progress through the different stages to unlock the game features. Accordingly, a player who decides to cash out may be discouraged from playing the same game again because the player has to go through the same stages to unlock the same game features.

There is thus a need to enable a player to save a game.

SUMMARY OF THE INVENTION

In a first aspect, the invention provides a method for enabling restoration of games, comprising:

receiving a request for subsequent restoration of a game at a gaming device;

selecting one of a plurality of game state identifiers associated with respective ones of a plurality of game states based on a current game state presented at the gaming device; and issuing the game state identifier.

In an embodiment, each game state corresponds to a stage of the game.

In an embodiment, each game state is associated with a game state identifier by mapping the game state to the game state identifier.

In an embodiment, issuing the game state identifier comprises printing a ticket comprising the game state identifier.

In an embodiment, issuing the game state identifier comprises transmitting a Short Messaging Service (SMS) message comprising the game state identifier.

In an embodiment, the method further comprises:

making a request for a session identifier from a server; and issuing the session identifier.

In a second aspect, the invention provides a game controller for a gaming device, the game controller configured to:

receive a request for subsequent restoration of a game at the gaming device;

select one of a plurality of game state identifiers associated with respective ones of a plurality of game states based on a current game state presented at the gaming device; and issue the game state identifier.

In an embodiment, each game state corresponds to a stage of the game.

In an embodiment, each game state is associated with a game state identifier by a game mapper configured to map a game state to a game state identifier.

In an embodiment, the game controller is further configured to communicate with a ticket printer for printing a ticket comprising the game state identifier.

In an embodiment, the game controller is further configured to communicate with an identifier transmitter for transmitting a Short Messaging Service (SMS) message comprising the game state identifier.

In an embodiment, the game controller is further configured to: make a request for a session identifier from a server; and issue the session identifier.

In a third aspect, the invention provides a method for restoring games, comprising:

receiving a game state identifier; and restoring a game at a gaming device to one of a plurality of game states associated with respective ones of a plurality of game state identifiers based on the game state identifier.

In an embodiment, each game state corresponds to a stage of the game.

In an embodiment, each game state is associated with a game state identifier by mapping the game state to the game state identifier.

In an embodiment, receiving a game state identifier comprises reading a ticket comprising the game state identifier.

In an embodiment, receiving a game state identifier comprises receiving input comprising the game state identifier.

In an embodiment, the method further comprises:

communicating a session identifier to a server; and receiving a communication in respect of whether the session identifier has been used previously to restore a game.

In a fourth aspect, the invention provides a game controller for a gaming device, the game controller configured to:

receive a game state identifier; and restore a game at the gaming device to one of a plurality of game states associated with respective ones of a plurality of game state identifiers based on the game state identifier.

In an embodiment, a game state corresponds to a stage of the game.

In an embodiment, each game state is associated with a game state identifier by a game mapper configured to map a game state to a game state identifier.

In an embodiment, the game controller is further configured to communicate with a ticket reader for reading a ticket comprising the game state identifier.

In an embodiment, the game controller is further configured to communicate with a keypad for receiving input comprising the game state identifier.

In an embodiment, the game controller is further configured to:

communicate with an interface for communicating a session identifier to a server; and receive a communication in respect of whether the session identifier has been used previously to restore a game.

In a fifth aspect, the invention provides a gaming system comprising:

a display for presenting play of a game to a player; and a game controller configured to:

receive a request for subsequent restoration of a game;

select one of a plurality of game state identifiers associated with respective ones of a plurality of game states based on a current game state presented at the gaming system; and issue the game state identifier.

In a sixth aspect, the invention provides a gaming system comprising:

a display for presenting play of a game to a player; and a game controller configured to:

receive a game state identifier; and restore the game to one of a plurality of game states associated with respective ones of a plurality of game state identifiers based on the game state identifier.

In a seventh aspect, the invention provides a gaming machine comprising:

a cabinet;

a display mounted within the cabinet for presenting play of a game to a player;

one or more input devices operable by a player to place a wager and initiate play of the game; and a game controller in data communication with the one or more input devices and the display, the game controller comprising a processor arranged to execute program code stored in a memory in order to conduct the game in response to operation of the one or more input devices, the program code including instructions such that in at least occasionally, the game controller, will as part of game play:

receive a request for subsequent restoration of the game;

select one of a plurality of game state identifiers associated with respective ones of a plurality of game states based on a current game state presented at the gaming machine; and issue the game state identifier.

In an eighth aspect, the invention provides a gaming machine comprising:

a cabinet;

a display mounted within the cabinet for presenting play of a game to a player;

one or more input devices operable by a player to place a wager and initiate play of the game; and a game controller in data communication with the one or more input devices and the display, the game controller comprising a processor arranged to execute program code stored in a memory in order to conduct the game in response to operation of the one or more input devices, the program code including instructions such that in at least occasionally, the game controller, will as part of game play:

receive a game state identifier; and restore the game to one of a plurality of game states associated with respective ones of a plurality of game state identifiers based on the game state identifier.

In a ninth aspect, the invention provides a gaming system comprising:

means for displaying play of a game to a player;

means for receiving a request for subsequent restoration of the game;

means for selecting one of a plurality of game state identifiers associated with respective ones of a plurality of game states based on a current game state presented at the gaming system; and means for issuing the game state identifier.

In a tenth aspect, the invention provides a gaming system comprising:

means for displaying play of a game to a player;

means for receiving a game state identifier;

means for restoring the game to one of a plurality of game states associated with respective ones of a plurality of game state identifiers based on the game state identifier.

In an eleventh aspect, the invention provides a game controller for a gaming system, comprising:

a restoration request receiver arranged to receive a request for subsequent restoration of a game at the gaming device;

a game state identifier selector arranged to select one of a plurality of game state identifiers associated with respective ones of a plurality of game states based on a current game state presented at the gaming device; and a game state issuer arranged to issue the game state identifier.

In a twelfth aspect, the invention provides a game controller for a gaming system, comprising:

a game state receiver arranged to receive a game state identifier; and a game state restorer arranged to restore a game at the gaming device to one of a plurality of game states associated with respective ones of a plurality of game state identifiers based on the game state identifier.

In a thirteenth aspect, the invention provides computer program code which when executed implements any one of the above methods.

In a fourteenth aspect, the invention provides a tangible computer readable medium comprising the above computer program code.

In a fifteenth aspect, the invention provides a data signal comprising the above computer program code.

In a sixteenth aspect, the invention provides transmitting or receiving the above computer program code.

In some aspects, a system is provided. The system includes a first game machine, a second game machine, and a session server communicatively coupled to the first game machine and the second game machine via a computer network. The session server includes a processor configured to at least receive, from the first game machine, a request from a player to enable restoration of a game, and in response to receiving the request to enable restoration of the game, register a session identifier in association with a player account of the player. The processor is also configured to store the session identifier in association with the player account to a session identifier database, and receive, from the second game machine and in response to a player request to restore the game, at least player account information associated with the player account. In addition, the processor is configured to retrieve the session identifier from the session identifier database in response to receiving the player account information, and determine, based upon the session identifier, whether to enable restoration of the game.

In some aspects, a method for enabling restoration of a game is described. The method includes receiving, by a session server and from a first game machine, a request from a player to enable restoration of a game, and in response to receiving the request to enable restoration of the game, registering, by the session server, a session identifier in association with a player account of the player. The method also includes storing, by the session server, the session identifier in association with the player account to a session identifier database, and receiving, by the session server and from a second game machine, at least player account information associated with the player account, where the player account information is received in response to a player request to restore the game. In addition, the method includes retrieving, by the session server, the session identifier from the session identifier database in response to receiving the player account information, and determining, by the session server and based upon the session identifier, whether to enable restoration of the game.

In some aspects, a tangible, non-transitory, computer-readable storage medium is provided. The storage medium has instructions stored thereon, which when executed by a processor, cause the processor to at least receive, from a first game machine, a request from a player to enable restoration of a game, and in response to receiving the request to enable restoration of the game, register a session identifier in association with a player account of the player. The instructions also cause the processor to store the session identifier in association with the player account to a session identifier database, and receive, from a second game machine and in response to a player request to restore the game, at least player account information associated with the player account. In addition, the instructions cause the processor to retrieve the session identifier from the session identifier database in response to receiving the player account information, and determine, based upon the session identifier, whether to enable restoration of the game.

BRIEF DESCRIPTION OF THE DRAWINGS

An exemplary embodiment of the invention will now be described with reference to the accompanying drawings in which.

DETAILED DESCRIPTION

Figure 1:
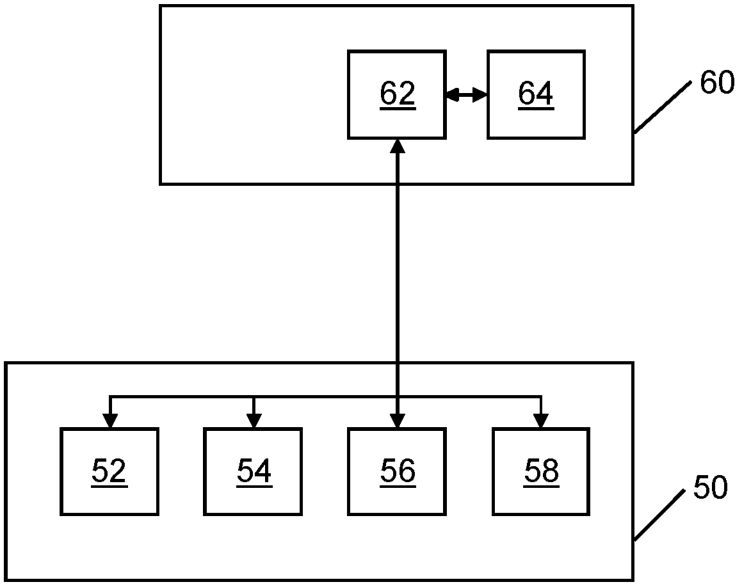
FIG. 1 is a block diagram of the core components of a gaming device.

Referring to the drawings, there is shown a gaming device having a game controller configured to employ one of a plurality of game state identifiers associated with respective ones of a plurality of game states to enable a game to be restored or to restore a game. Advantageously, the game state identifiers allow the game controller to easily duplicate game states when enabling a game to be restored. This allows players to restore a game at a later time, for example, to access game features previously unlocked in the game.

In certain embodiments, the gaming device is provided as part of a gaming system, where the game controller also relies on a session identifier from a session server. The session identifier provides a simple yet effective way of controlling the number of times a game may be restored, typically so it can only be restored once.

It is envisaged that a game state corresponds to a particular stage of a game. Persons skilled in the art will appreciate that a game state need not correspond only to the end or beginning of a stage of a game and that a game state may correspond to any point of a game. For example, a game state may correspond to the middle of a game stage where a new game feature is unlocked.

It is envisaged that a predetermined plurality of game state identifiers are associated with respective ones of the plurality of game states. It is envisaged that each game state is associated with a game state identifier by a game state mapper configured to map the game state to the game state identifier. Persons skilled in the art will appreciate that the game state mapper may be implemented by a processor of a computer based on computer program code stored in a memory or other tangible storage medium. Herein the term "processor" is used to refer generically to any device that can process game instructions and may include: a microprocessor, microcontroller, programmable logic device or other computational device, a general purpose computer (for example, a PC) or a server.

General Construction of the Gaming Device

In an embodiment, the gaming device is a stand alone gaming machine wherein all or most components required for enabling restoration of games or for restoring games are present in a player operable gaming machine.

The gaming device has several core components. At the broadest level, the core components are a player interface 50 and a game controller 60 as illustrated in FIG. 1. The player interface is arranged to enable manual interaction between a player and the gaming device and for this purpose includes the input/output components required for the player to enter instructions to play a game, observe game outcomes, to enable restoration of a game, or to restore a game.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to enable a player to input/output instructions for enabling the restoration of a game or for restoring a game), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. As discussed earlier, a "processor" may be any device that may be arranged or configured to process game play instructions in accordance with game play rules and may include: a microprocessor, microcontroller, programmable logic device or other computational device, a general purpose computer (e.g. a PC) or a server.

Figure 2:
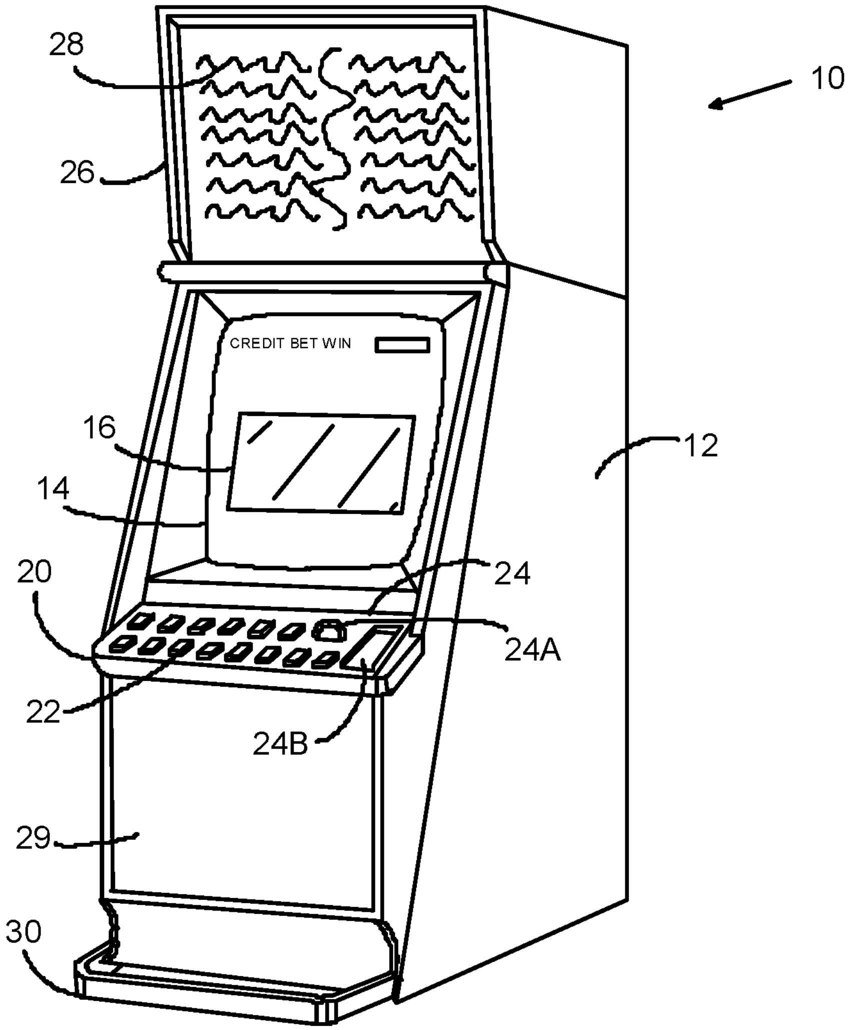
FIG. 2 is a perspective view of a stand alone gaming device.

A gaming device in the form of a stand alone gaming machine 10 is illustrated in FIG. 2. The gaming machine 10 includes a console 12 having a display 14 on which are displayed representations of a game 16 that can be played by a player. Although not illustrated, the gaming machine also includes readers/printers for a player to insert a ticket and/or to retrieve a ticket printed by the gaming machine, a keypad for a player to enter game restoration information and a transmitter for sending out game restoration information. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box

26 may also include a display, for example a video display unit, which may be of the same type as the display 14, or of a different type.

Figure 3:
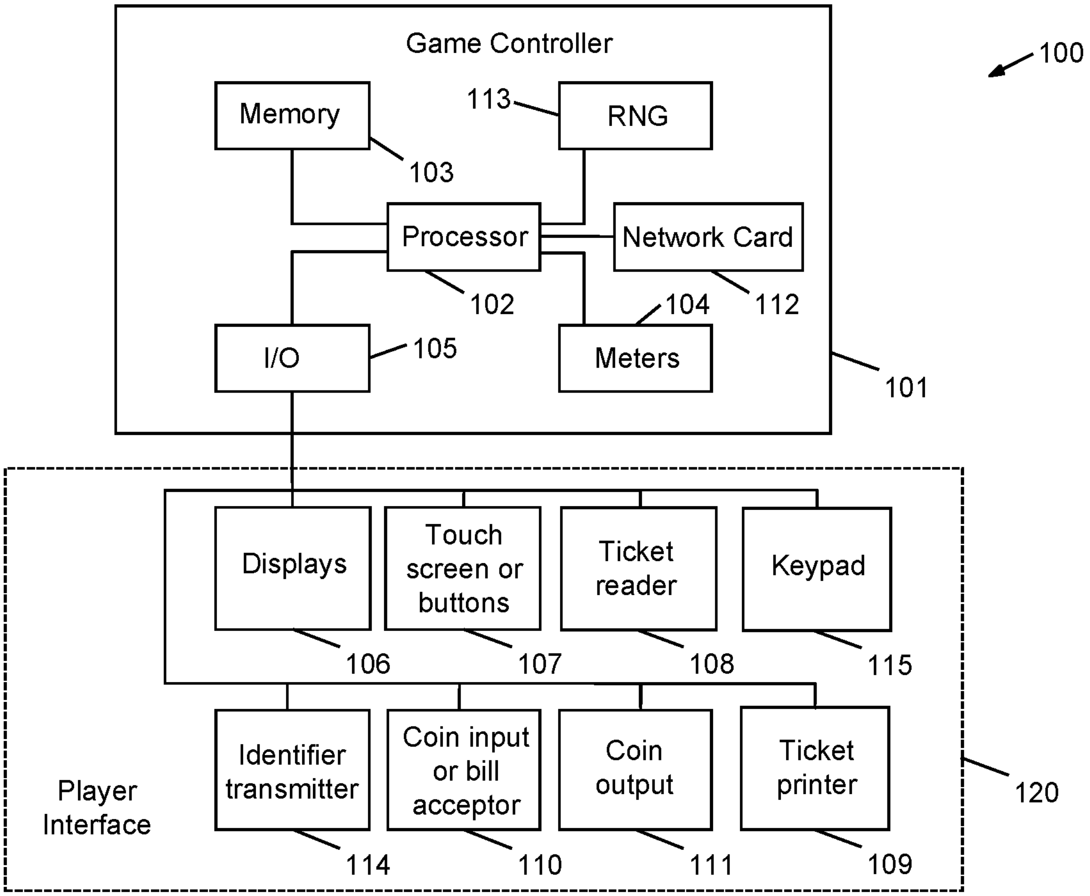
FIG. 3 is a block diagram of the functional components of a gaming device.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes game restoration devices that communicate with the game controller 101. These include a ticket printer 109, a ticket reader 108, an identifier transmitter 114 and a keypad 115. In addition, the player interface also comprise peripheral devices including one or more displays 106, a touch screen and/or buttons 107 (which provide a game play mechanism), a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used.

In addition, the gaming machine 100 may include a communications interface, for example a network card 112. The network card may, for example, send requests for information or other information to a session server and receive requests for information or other information from a session server.

Figure 4:
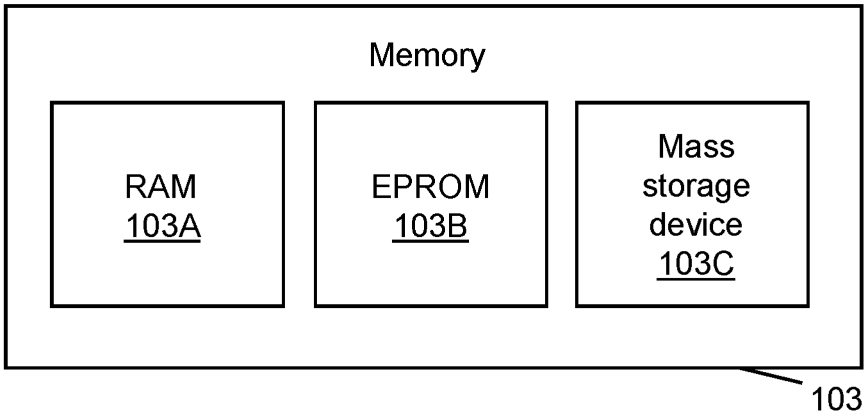
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

General Construction of the Gaming Device as Part of a Gaming System

In another embodiment, the gaming device is part of a gaming system wherein some of the components required for enabling restoration of games or restoring games are present in a player operable gaming machine and some of the components required for implementing the game are located remotely relative to the gaming machine. For example, some of the steps for enabling the restoration of a game may be executed on a player operable gaming machine and some of the steps for restoring a game may be executed remotely by a session server.

In addition, it will be understood that other arrangements are envisaged. For example, a gaming system may be provided wherein a gaming machine is networked to a session server and the respective functions of the gaming machine and the gaming server are selectively modifiable. For example, the gaming machine, although part of the gaming system, may operate in stand alone gaming machine mode depending on the game being played, operating conditions, and so on. Other variations will be apparent to persons skilled in the art.

Figure 5:
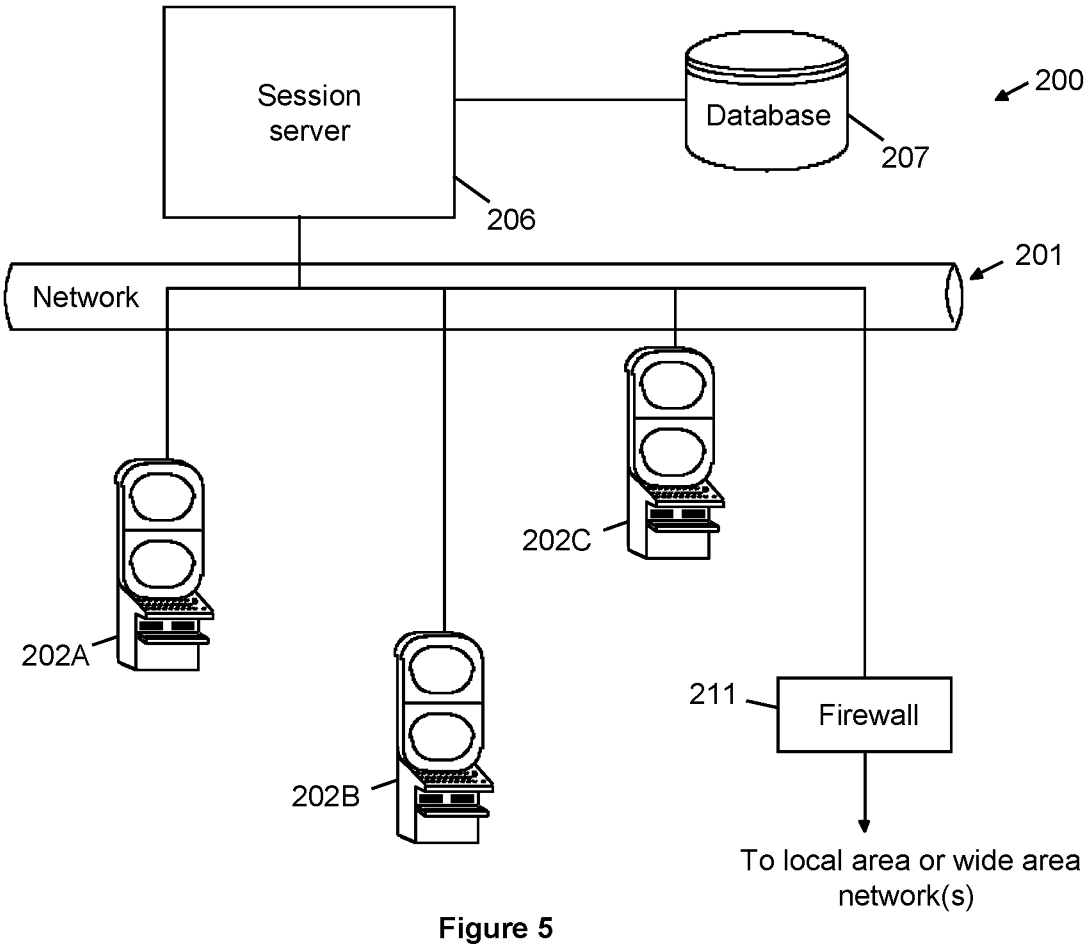
FIG. 5 is a schematic diagram of a gaming system.

FIG. 5 shows a gaming system 200 in accordance with an embodiment. The gaming system 200 includes a network 201, which for example may be an Ethernet network. Gaming machines 202A,202B,202C in FIG. 5 are connected to the network 201. The gaming machines 202A,202B,202C each provide a player operable interface and may be the same as the gaming machines 10,100 shown in FIGS. 2 and 3, or may have simplified functionality depending on the requirements for enabling restoration of games and for restoring games. While gaming machines 202A,202B,202C are illustrated as being individually connected to the network 201, banks of two or more gaming machines are also envisaged.

In FIG. 5, there is also illustrated a session server 206 for administering session identifiers that are stored in a database 207. As discussed earlier, these session identifiers may be used together with the game state identifiers to enable the restoration of a game or to restore a game played in any one of the gaming machines 202A,202B,202C. In FIG. 5, the session server 206 is illustrated as a central server that communicates with all of the gaming machines 202A,202B,202C.

The gaming system 200 may communicate with other gaming systems, other local networks, for example a corporate network, and/or a wide area network such as the Internet, for example through a firewall 211.

Persons skilled in the art will appreciate that in accordance with known techniques, the session server 206 need not be centralized and that the functionality at the server side of the network may be distributed over a plurality of different computers. For example, elements may be run as a single "engine" on one server or a separate server may be provided. That is, the session server can be implemented in a distributed fashion wherein the gaming machines are connected to separate session servers each of which is able to communicate with the database 207. It is also envisaged that the database 207 itself may be implemented in a distributed fashion. For example, a central session server 206 can communicate with multiple databases so that some of the session identifiers are stored in one database and the other session identifiers are stored in another database.

Further Detail of the Gaming System

Figure 6:
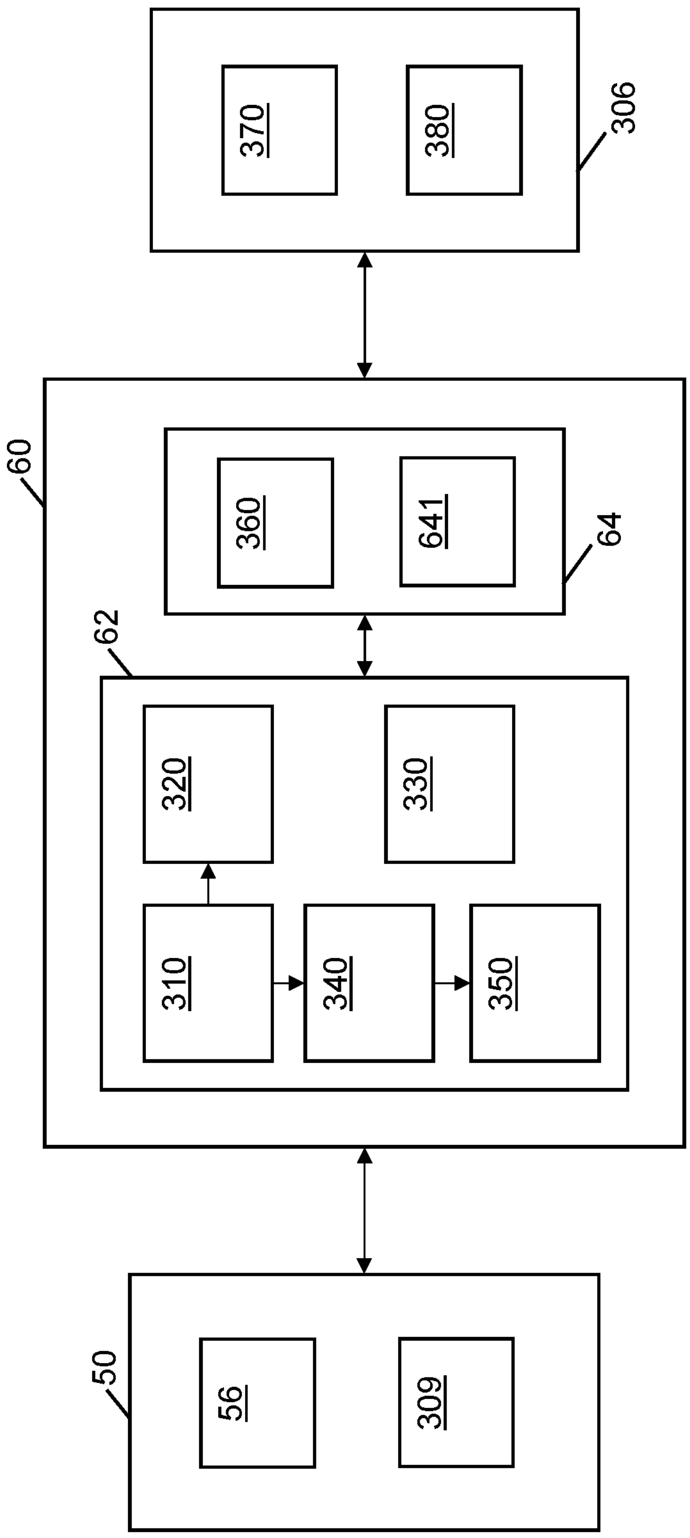
FIG. 6 is a block diagram of a gaming system.

FIG. 6 illustrates, in an embodiment, the game controller of a gaming device. In FIG. 6, the game controller 60 is shown implementing a number of modules to enable the restoration of a game. Persons skilled in the art will appreciate that the modules are based typically on program code 641 and data stored in memory 64. Persons skilled in the art will also appreciate that the modules are implemented typically using processor 62 but that some of the modules could be implemented in some other way, for example by a dedicated circuit.

In FIG. 6, the modules include a restoration request receiver 310 which operates in response to a player's operation of player interface 50 by having the player operate an input device 56 (e.g. pressing the touch screen and/or one of more buttons) to receive a request for subsequent restoration of a game. The restoration request receiver 310 is also arranged to communicate the request for subsequent restoration of a game to a session identifier requestor 320 and a game state identifier selector 340. The session identifier requestor 320 is arranged to make a request for a session identifier from a session server 306. In an embodiment, this request for a session identifier can be transmitted through a network via a network card of a gaming device. The session server 306 is arranged to receive this request. A session identifier generator 370 is arranged to generate a session identifier. Persons skilled in the art would appreciate that this can be done in a variety of ways (for example by generating a pseudo-random number sequence) and that the session identifier can be of a variety of lengths (for example, a 16 bit sequence) and/or be in different format (for example, a hexadecimal sequence). The session server 306 is arranged to output the session identifier upon receiving this request to a session identifier issuer 330. The session generator 306 is also arranged to transmit the newly generated session identifier to a session identifier database 380 to update the database. The session identifier database 380 is arranged to store the session identifiers that have been issued. The session identifier issuer 330 is arranged to issue the session identifier to the player interface 50.

The game state identifier selector 340 is arranged to select one of a plurality of game state identifiers associated with respective ones of a plurality of game states based on the current game state presented at the gaming device. In this embodiment, the game state identifier selector 340 is arranged to select a game state identifier from a game state identifier database 360. The game state identifier database 360 is arranged to store a predetermined set of game state identifiers corresponding to various game states. The game state identifier selector 340 is arranged so that the selected game state identifier can be communicated to a game state issuer 350 which is arranged to issue the game state identifier to the player interface 50.

The player interface 50 is arranged so that either the session identifier or the game state identifier or both the session identifier and the game state identifier can be output to a user. In this embodiment, a ticket printer 309 is used to output the session identifier and/or the game state identifier by printing a ticket comprising either the session identifier or the game state identifier or both the session identifier and the game state identifier. In an alternative embodiment, either or both the session identifier and/or the game state identifier can be output to a user by an identifier transmitter which transmits a Short Messaging Service (SMS) message comprising either the session identifier or the game state identifier or both the session identifier and the game state identifier. Typically, users are output with both a game state identifier and a session identifier.

Figure 7:
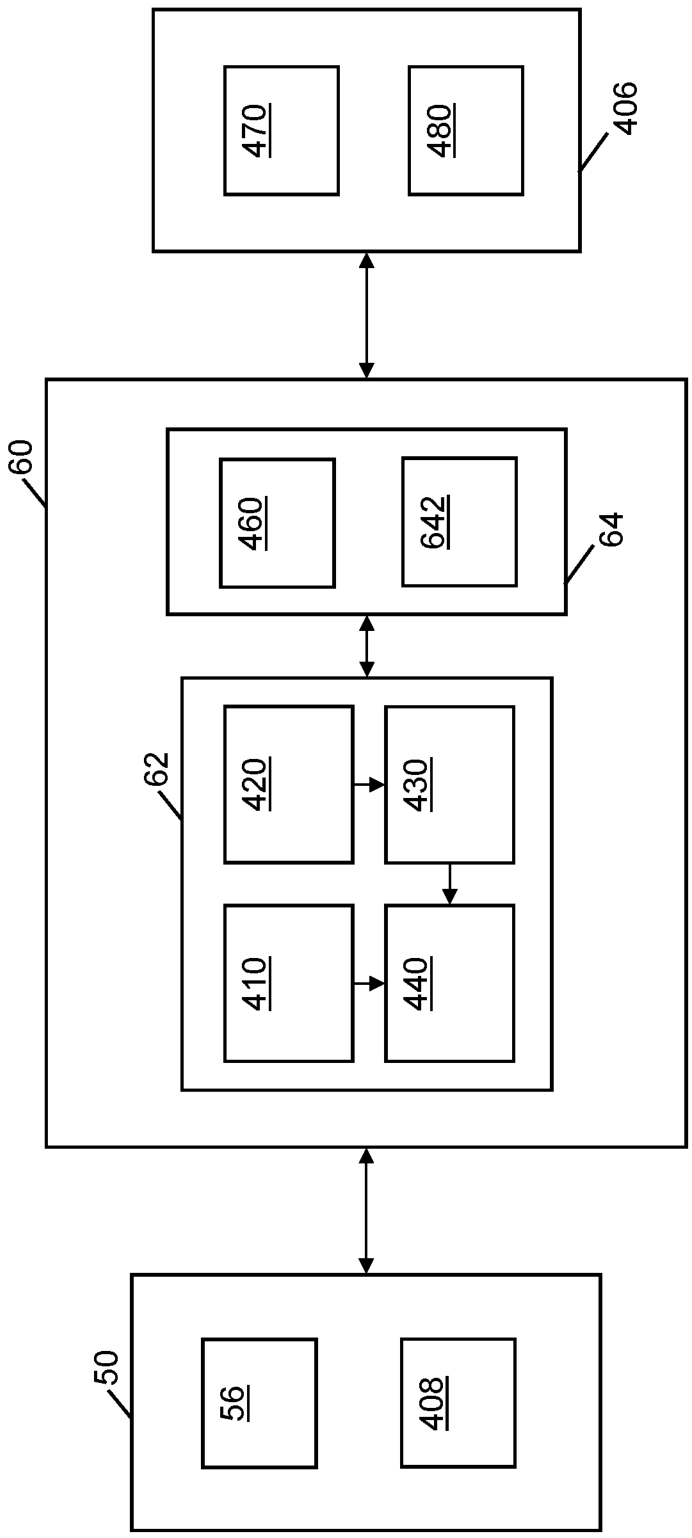
FIG. 7 is a block diagram of a gaming system.

FIG. 7 illustrates the game controller 60 implementing a set of modules to restore a game. As with FIG. 6, persons skilled in the art will appreciate that the modules are typically implemented by processor 62 based on program code 642 stored in memory 64 but that some of the modules could be implemented in some other way, for example by a dedicated circuit.

The modules include a game state identifier receiver 410 arranged to receive a game state identifier from the player interface 50. In this embodiment, a game state identifier is received when a player inserts a ticket comprising the game state identifier into a ticket reader 408. Alternatively, a game state identifier may be received when a player enters the game state identifier on one of the input devices 56 of the gaming device (e.g. by entering the game state identifier on a keypad). Person skilled in the art will appreciate that an input device can be used in various ways so as to allow a game state identifier to be received; for example, a "virtual" keypad on the touch screen of the gaming device can be used to enter the game state identifier.

The modules of the game controller 60 also include a session identifier receiver 420 arranged to receive a session identifier from the player interface 50. In this embodiment, a session identifier is received when a player inserts a ticket comprising the session identifier into the ticket reader 408. It is envisaged that a ticket can comprise either the game state identifier or the session identifier or both the session identifier and the game state identifier. In an alternative embodiment, the session identifier can be received when a player enters the session identifier using one of the input devices 56. It is envisaged that a player may enter a game state identifier (or a session identifier) using one of the input devices 56 but use a ticket to provide the session identifier (or game state identifier).

The session identifier receiver 420 is arranged so that the session identifier received from the player interface 50 may be communicated to the session identifier communicator 430 so as to determine whether the session identifier received from the player interface 50 has been previously used to restore a game. In an embodiment, this communication is transmitted through a network via the network card. In this embodiment, a session identifier verifier 470 is arranged to determine whether the session identifier received from the player interface 50 has been previously used to restore a game by searching through a session identifier database 480 which stores the session identifiers that have been issued by not previously used to restore a game. The session identifier communicator 430 is arranged so that the result of this determination can be communicated to a game state restorer 440. Person skilled in the art will appreciate that the determination of whether the session identifier received from the player interface 50 has been previously used to restore a game can also be done in a variety of ways and can depend on how the session identifier was issued. The session identifier communicator 430 is also arranged to communicate to the game state restorer 440 that an otherwise invalid session identifier was received from the player interface 50. In this embodiment, once the session identifier verifier 470 determines that the session identifier from the player interface 50 has not been previously used to restore a game, it deletes the session identifier listed in the session identifier database 480 so that the same session identifier cannot be used in the future to restore another game. Persons skilled in the art would appreciate that the session identifier verifier need not always restrict each session identifier to be used only once. For example, each session identifier stored in the session identifier database can be associated with a count value that is decremented each time a session identifier is used to restore a game. In this way, each session identifier can be used to restore a game a plurality of times instead of just once.

The game state restorer 440 is arranged to restore a game at the gaming device to one of a plurality of game states associated with respective ones of a plurality of game state identifiers based on the game state identifier communicated from the game state identifier receiver 410 if the game state restorer 440 receives from the session identifier communicator 430 the determination that the session identifier has not yet been used and is otherwise valid. In this embodiment, the game state restorer 440 is arranged to restore a game by restoring the game to the game state that is associated with the game state identifier communicated from the game state identifier receiver 410.

Persons skilled in the art will appreciate that a game controller will typically implement not only the modules of FIG. 6 but also the modules of FIG. 7. Accordingly, a game controller may be used both to enable restoration of games and to restore games.

Figure 8:
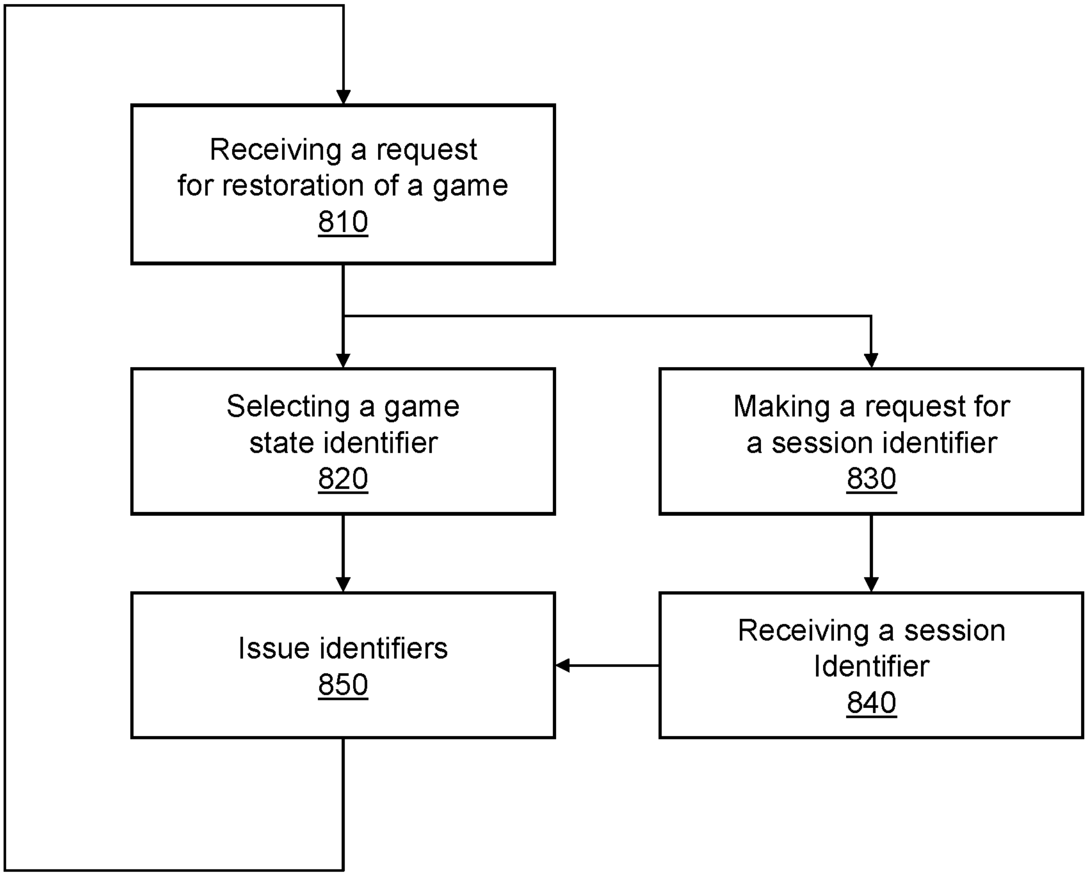
FIG. 8 is a flow chart of an embodiment.

The method of enabling restoration of games is outlined in FIG. 8. First, a request for enabling restoration of a game is received at a gaming device 810. This request may be initiated by a player using a touch screen and/or buttons of the gaming device during play of a game. After the request is received, one of a plurality of game state identifiers (each associated with a respective one of plurality of game states) is selected based on the game state currently being presented at the gaming device 820. A request for a session identifier from the session server is also made 830 after the request for enabling restoration is received. After a session identifier is received from the session server 840, the selected game state identifier and the received session identifier is then issued 850 and a ticket printer prints a ticket comprising the game identifier and session identifier. Once the game state identifier is printed, the game presented at gaming machine is stopped and a database is updated to reflect that the particular session identifier has been issued.

Person skilled in the art will appreciate that the game identifier and/or session identifier can be issued in other ways. For example, the session identifier can be issued by requesting the player to enter his/her mobile phone number on the keypad of a gaming device that is connected via a network to a SMS Gateway and transmitting from the SMS Gateway a Short Messaging Service (SMS) message comprising the game identifier and/or session identifier to the player's mobile phone, where it will be stored in a memory of the phone.

It is also envisaged that a player may input player information (such as a player's loyalty membership details) via a keypad, touch screen and/or buttons to register the ticket before or after the ticket is printed by a ticket printer so that the player can restore a game even if he has lost the ticket.

Additionally, the ticket, game state identifier and/or session identifier may also be associated with a pin or password so that only the player is able to use the ticket, game state identifier and/or session identifier.

Figure 9:
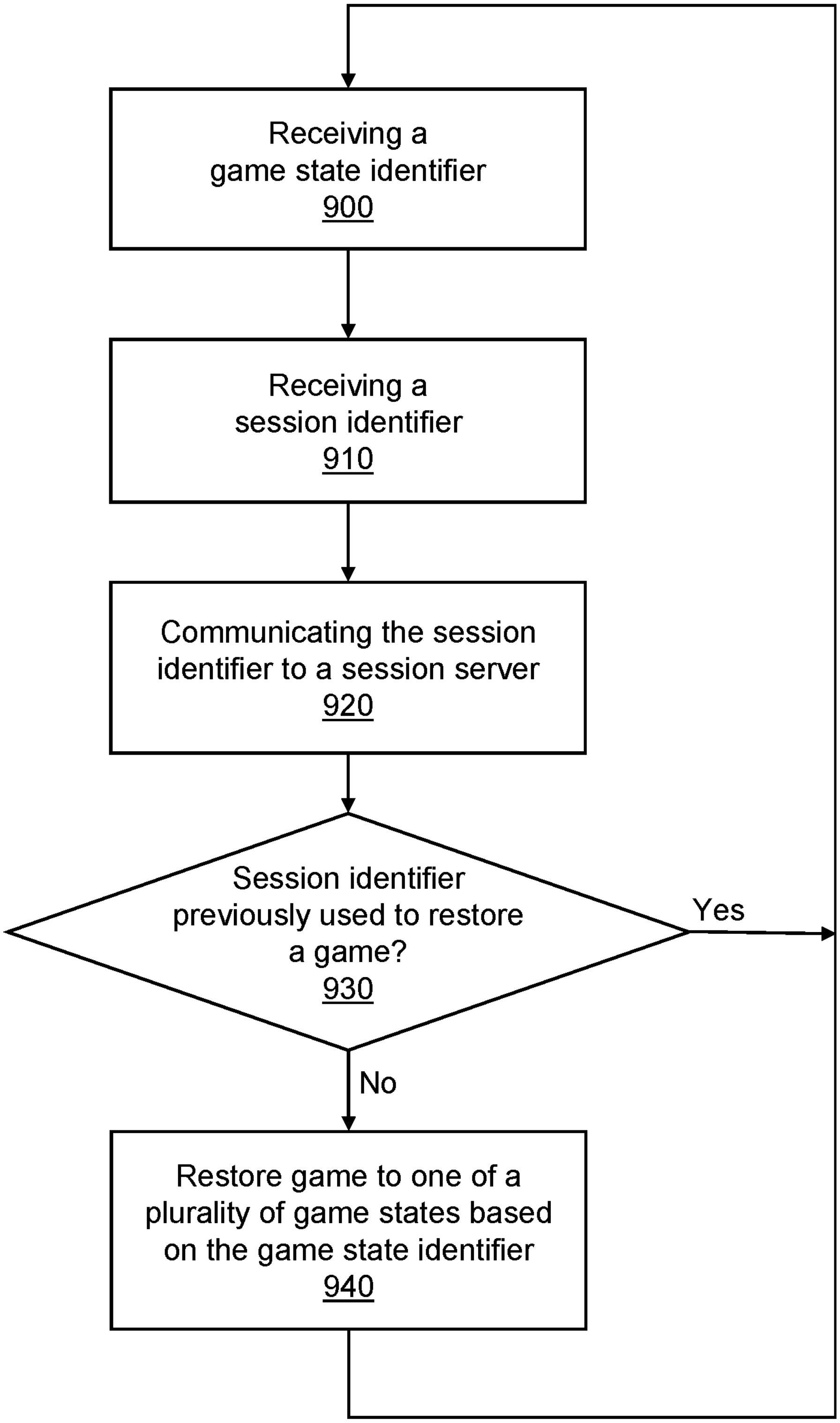
FIG. 9 is a flow chart of an embodiment.

The method of restoring games corresponding to the above method of enabling restoration of games is illustrated in FIG. 9. A game state identifier is first received at a gaming device 900. This game state identifier can be received by having a player enter the game state identifier manually using a keypad of the gaming device or by having the player insert a valid ticket into the ticket reader of the gaming device. Next a session identifier is received 910. The session identifier can also be received via the keypad or the ticket reader of the gaming device. This can involve entering player information (if the player lost his ticket) and/or entering a pin or associated password using the keypad, touch screen and/or buttons. Both the game state identifier and the session identifier can be received simultaneously or one can be received before the other. The session identifier is then communicated to a session server 920. Upon receiving this communication, a determination as to whether the session identifier was previously used to restore a game is made 930. It is envisaged that the session identifier or the game state identifier may also be validated before this determination is carried out. If it is determined that the session identifier was previously used or either or both the session identifier or the game state identifier are invalid identifiers, the gaming device reverts back to the state of waiting to receive a game state identifier. If it is determined that the session identifier was not previously used and that both the game state identifier and the session identifier are valid, the gaming device then proceed to restore a game to one of the plurality of game states based on the game state identifier 940.

Further aspects of the method will be apparent from the above description of the gaming system. Persons skilled in the art will also appreciate that the method could be embodied in program code. The program code could be supplied in a number of ways, for example on a tangible computer readable medium, such as a disc or a memory (for example, that could replace part of memory 103) or as a data signal (for example, by transmitting it from a server).

Similarly, it will be appreciated that the identifiers can be supplied on any appropriate tangible data carrier, such as by writing them to a magnetic swipe card, storing them in a memory (including transmitting identifiers to a device having a memory) etc.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A computer system for controlling a plurality of game machines, the computer system comprising:

a first game machine;

a second game machine; and a session server communicatively coupled to the first game machine and the second game machine via a computer network, the session server including a processor configured to at least:

receive, from the first game machine, a request from a player to enable restoration of a game at a defined game state;

in response to receiving the request to enable restoration of the game, register a session identifier in association with a player account of the player;

store the session identifier in association with the player account to a session identifier database;

receive, from the second game machine and in response to a player request to restore the game, at least player account information associated with the player account;

in response to receiving the player account information, retrieve the session identifier from the session identifier database;

verify that the session identifier has not been previously used to enable restoration of the game; and in response to the verification, cause the game to be restored at the defined game state on the second game machine so that the player can continue to play the game.

2. The computer system of claim 1, wherein the processor is further configured to transmit the session identifier to the first game machine, wherein the first game machine provides the session identifier to the player on a printed ticket.

3. The computer system of claim 1, wherein the processor is further configured to issue the session identifier to the player as a text message delivered to a mobile communication device of the player.

4. The computer system of claim 1, wherein the processor is further configured to log the player into the player account prior to enabling restoration of the game using the player account information received from the second game machine.

5. The computer system of claim 4, wherein the player account information includes at least one of a player account password or a player account personal identification number ("PIN").

6. The computer system of claim 1, wherein the processor is further configured to:

generate a pseudo-random number sequence to create the session identifier;

associate a count value with the session identifier; and decrement the count value in response to enabling restoration of the game using the session identifier.

7. A method for enabling restoration of a game, the method comprising:

receiving, by a session server and from a first game machine, a request from a player to enable restoration of a game at a defined game state;

in response to receiving the request to enable restoration of the game, registering, by the session server, a session identifier in association with a player account of the player;

storing, by the session server, the session identifier in association with the player account to a session identifier database;

receiving, by the session server and from a second game machine, at least player account information associated with the player account, the player account information received in response to a player request to restore the game;

in response to receiving the player account information, retrieving, by the session server, the session identifier from the session identifier database;

verifying, by the session server, that the session identifier has not been previously used to enable restoration of the game; and in response to the verification, causing, by the session server, the game to be restored at the defined game state on the second game machine so that the player can continue to play the game.

8. The method of claim 7, further comprising transmitting, by the session server, the session identifier to the first game machine, wherein the first game machine provides the session identifier to the player on a printed ticket.

9. The method of claim 7, further comprising issuing, by the session server, the session identifier to the player as a text message delivered to a mobile communication device of the player.

10. The method of claim 7, further comprising logging, by the session server, the player into the player account prior to enabling restoration of the game using the player account information received from the second game machine.

11. The method of claim 10, wherein the player account information includes at least one of a player account password or a player account personal identification number ("PIN").

12. The method of claim 7, further comprising:

generating, by the session server, a pseudo-random number sequence to create the session identifier;

associating, by the session server, a count value with the session identifier; and decrementing, by the session server, the count value in response to enabling restoration of the game using the session identifier.

13. A tangible, non-transitory, computer-readable storage medium having instructions stored thereon, which when executed by a processor, cause the processor to at least:

receive, from a first game machine, a request from a player to enable restoration of a game at a defined game state;

in response to receiving the request to enable restoration of the game, register a session identifier in association with a player account of the player;

store the session identifier in association with the player account to a session identifier database;

receive, from a second game machine and in response to a player request to restore the game, at least player account information associated with the player account;

in response to receiving the player account information, retrieve the session identifier from the session identifier database;

verify that the session identifier has not been previously used to enable restoration of the game; and in response to the verification, cause the game to be restored at the defined game state on the second game machine so that the player can continue to play the game.

14. The computer-readable storage medium of claim 13, wherein the instructions, when executed, further cause the processor to transmit the session identifier to the first game machine, wherein the first game machine provides the session identifier to the player on a printed ticket.

15. The computer-readable storage medium of claim 13, wherein the instructions, when executed, further cause the processor to issue the session identifier to the player as a text message delivered to a mobile communication device of the player.

16. The computer-readable storage medium of claim 13, wherein the instructions, when executed, further cause the processor to log the player into the player account prior to enabling restoration of the game using the player account information received from the second game machine.

17. The computer-readable storage medium of claim 13, wherein the instructions, when executed, further cause the processor to:

generate a pseudo-random number sequence to create the session identifier;

associate a count value with the session identifier; and decrement the count value in response to enabling restoration of the game using the session identifier.

* * * * *